Actinomycin $F_1$

Actinomycin C

Fig. 2.
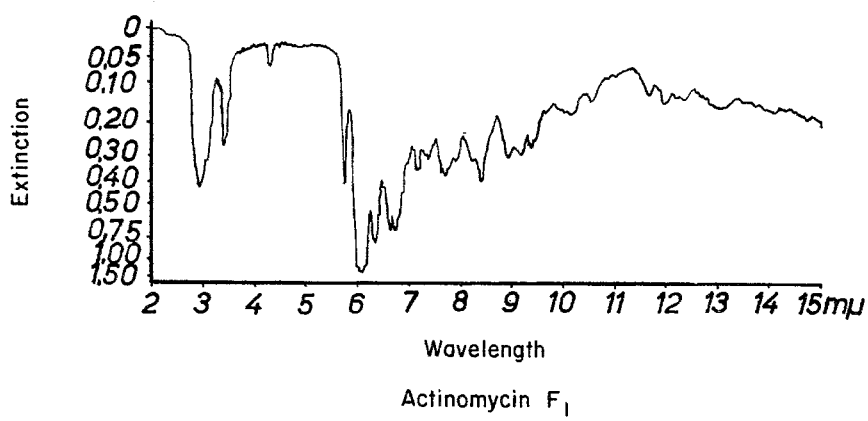
Actinomycin $F_1$
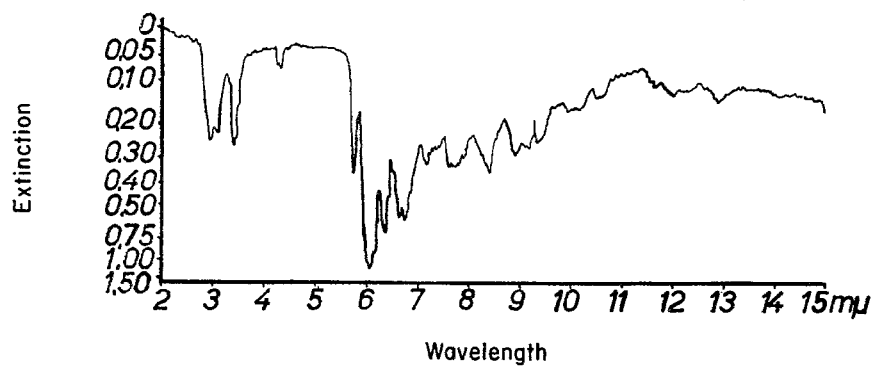
Actinomycin $F_3$
Fig. 3.
INVENTORS
Günther Schmidt-Kastner
Christian Hackmann
BY
Charles J. Elderkin
ATTORNEY

United States Patent Office

3,219,544
Patented Nov. 23, 1965

3,219,544
PROCESS FOR PRODUCING ANTIBIOTIC
Günther Schmidt-Kastner and Christian Hackmann, Wuppertal-Elberfeld, Germany, assignors, by mesne assignments, to Farbenfabriken Bayer Aktiengesellschaft, a corporation of Germany
Filed Mar. 13, 1957, Ser. No. 645,762
2 Claims. (Cl. 195—80)

This invention relates to new and useful substances of the antibiotic class, i.e., chemical substances which are produced by microorganisms and which are in turn effective in inhibiting the growth, or destroying other microorganisms, and to a new method or process for producing such substances. More particularly, the invention contemplates the provision of new amino acid-modified biosynthetic derivatives of the specific antibiotic substances obtained by cultivation of the Actiomyces species *Streptomyces chrysomallus* (NRRL–2250 Culture Collection Section, Fermentation Division of the Northern Regional Research Laboratory, Peoria, Illinois) and similar actinomycin C-elaborating strains such as Streptomyces BOP 476 (NRRL 2580) etc., as well as a unique process for the production and isolation of such biosynthetic substances. The unique compounds of the invention are found to be capable of inhibiting the growth of tumors.

Heretofore, the red crystalline, antibiotically active metabolism products of certain Streptomyces have become known under the generic name "actinomycins." In copending U.S. application Serial No. 444,946, filed on July 22, 1954, by Hans Brockmann and Arnold Bohne and entitled, "Antibiotic and Method of Preparation," now U.S. Pat. 2,953,495 there are described and claimed the heterogeneous antibiotic substance "Actinomycin C" as obtained by cultivation of the aforementioned microorganism *Streptomyces chrysomallus*, and the component C-actinomycins $C_1$, $C_2$ and $C_3$ derived therefrom.

Apart from the foregoing investigations conducted towards the production of actinomycins by pure chemical syntheses, it has been found, also, that the composition of the peptide component of the actinomycin molecules can be altered by the addition of individual amino acids to the culture media of actinomycin-producing strains of Streptomycetes, thereby permitting the production of a variety of new biosynthetic actinomycins not previously available by pure biological syntheses. Thus, with reference to German Patent No. 944,395 of December 22, 1955, a number of different actinomycin mixtures have been produced by the addition of various amino acids to actinomycin C-elaborating strains. The ring-partition chromatogram of the actinomycin mixture produced upon addition of sarcosine to culture strain Streptomyces BOP 476 (NRRL 2580), for example, was found to consist of equal parts of five main component actinomycins having the $R_{C_2}$ values 0.6, 0.8, 1.0, 1.3 and 1.6, respectively. The $R_{C_2}$ values 0.6, 1.0 and 1.6 correspond to the actinomycins $C_1$, $C_2$ and $C_3$ which are also obtained when the same actinomycin-elaborating strain is cultivated without the addition of sarcosine. Upon fractionating this apparent five-component actinomycin mixture by partition chromatography over powdered-cellulose columns with the aid of solution-promoting agents in the aqueous phase, and, in particular, by means of m-cresotinic acid, the five individual actinomycins to be expected in view of the ring-partition chromatogram were isolated from the mixture and reported heretofore.

It is the principal object of the present invention to provide new actinomycins from actinomycin mixtures of the type produced upon addition of sarcosine (or compounds which are converted into sarcosine under the culture conditions employed) to C-actinomycin cultures, together with a process for the production of such actinomycins in pure form involving use of partition and adsorption chromatography.

The process of the invention is based, in part, on our discovery that a further partition of actinomycin mixtures of the foregoing type can be effected on alumina. Thus, while all of the antinomycin mixtures known heretofore, on elution of the alumina adsorption medium with benzol acetic ester, behave like homogeneous substances, the actinomycin mixture obtained by addition of sarcosine to actinomycin C-elaborating strains such as Streptomyces BOP 476, separates into three zones which can be recovered independently. The first zone of the alumina column contains the mixed component actinomycins $C_1$, $C_2$ and $C_3$, viz., those components which, according to the ring-partition chromatogram referred to above, have the $R_{C_2}$ values 0.6, 1.0 and 1.6, respectively. In the second zone of the alumina column there are present, besides a component ($F_o$) occurring in traces only, two actinomycins which, according to the same ring-partition chromatogram, have the $R_{C_2}$ values 0.8 and 1.3. These components have been designated as actinomycins $F_2$ and $F_4$, respectively. Since the full complement of all five actinomycins demonstrated by the ring-partition chromatogram are eluted within the first two zones of the column, it was postulated that unexpected partition obtained within the third zone of the column represented one or more new actinomycins. Furthermore, since the presence of the new actinomycin or actinomycins was not clearly demonstrated by the ring-partition chromatogram, it was also assumed that the components of the third zone of the adsorption column had $R_{C_2}$ values equivalent to the actinomycins eluted in the first and/or second zones of the column. Upon further examination, it was found that apart from minor fractions of components $F_2$ and $F_4$ which are considered to be residual constituents of the second zone of the alumina column, two new actinomycins of the same $R_{C_2}$ values as actinomycins $C_1$ and $C_2$, namely, 0.6 and 1.0, were present within the third zone of the column. We have designated these new actinomycins $F_1$ and $F_3$, respectively.

The new actinomycins $F_1$ and $F_3$ can be obtained in pure form by separating into individual fractions, the actinomycin mixture obtained by cultivation of an actinomycin C-elaborator on sarcosine-containing nutrient solutions, first on the cellulose-powder column, and, thereafter, by further fractionating chromatographically on alumina, those fractions corresponding in $R_{C_2}$ values to the components $C_1$ and $C_2$. Alternatively, the mixed actinomycins can be broken up on alumina, initially, and the most difficultly elutable fraction can then be separated into its components on the cellulose column. It is found that the process of the invention is applicable to any actinomycin C-elaborating strain capable of producing, under the sarcosine-modified culture conditions described, actinomycin mixtures having contents of actinomycins $F_1$ and $F_3$ sufficiently high to warrant treatment for their isolation and recovery.

As chromopeptides, the actinomycins contain, in addition to the chromophore grouping, two side chains containing amino acid radicals. While all actinomycins isolated heretofore contain proline or hydroxyproline within their amino acid make-up, it is found upon hydrolyzing the new actinomycins $F_1$ and $F_3$ that both of these amino acids are absent within the hydrolyzate produced. The actinomycins of the invention also differ in other respects from known actinomycins. Thus, both of the actinomycins $F_1$ and $F_3$ are considerably less toxic than known antibiotic substances of the same general class. For example, while the toxicity of actinomycins $C_1$, $C_2$, $C_3$, I and X under certain test conditions amounts to 0.8 mg.

per kg. (mouse), administered intravenously, under the same conditions actinomycin $F_1$ is 5 mg./kg. while actinomycin $F_3$ is 7 mg./kg. In spite of their lower toxicity, however, the new actinomycins retain the characteristic cytostatic activity of the known C-actinomycins.

Thus, with actinomycin $F_1$ administered to rats having Rous and Jansen sarcomas, in 5 doses of 60γ/kg. each, a distinct tumor inhibitory effect was observed which became increasingly more pronounced as higher doses were administered, and no toxic phenomena were observed. Actinomycin C administered to the rats in 5 doses of 60γ/kg. each, was equally efficacious, but with higher dosage levels, such as 5 doses of 100γ/kg. each, serious toxic lesions occurred in most of the animals.

Actinomycin $F_3$, administered in 6 doses of 60–500γ/kg. each in cases of Walker's carcinoma, was observed to have an inhibitory action on tumor growth. It is considered remarkable that the normal increase in body weight of the animals was not altered as compared with that of control animals. In repeat experiments, higher doses of actinomycin $F_3$ were administered until a dosage of $5 \times 1000$γ/kg. brought about exitus in 1 of 7 animals treated. Dosages of $5 \times 500$γ/kg. were well tolerated by all animals, and the tumor growth of Walker's carcinoma was distinctly checked within the dosage range $5 \times 100$–$5 \times 1000$γ/kg.

It is believed that the invention may be best understood by reference to the following detailed description of specific embodiments thereof taken in conjunction with the accompanying drawings wherein:

FIG. 2 illustrates the infrared spectrum of actinomycin $F_1$;

FIG. 3 illustrates the infrared spectrum of actinomycin $F_3$; and

Figure 1:
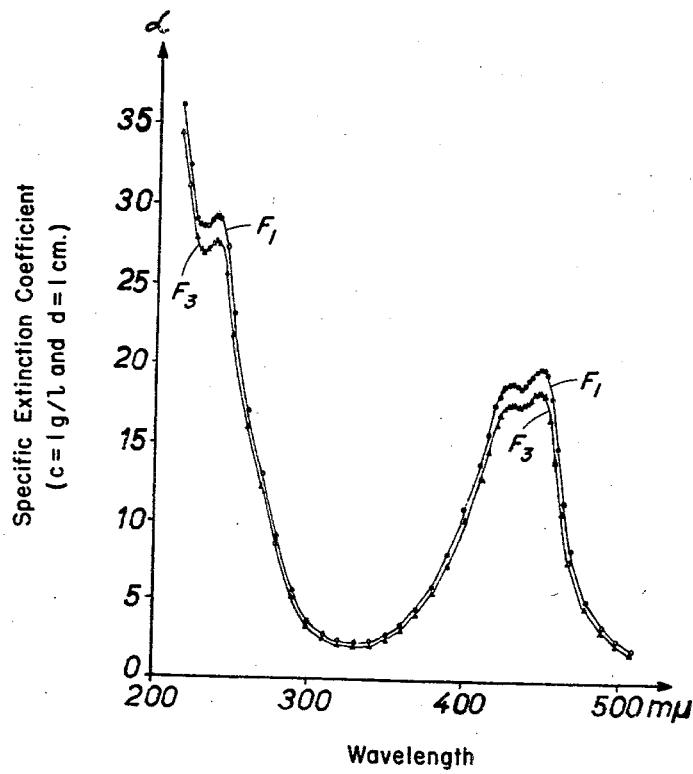
FIG. 1 illustrates the ultraviolet spectra of actinomycins $F_1$ and $F_3$, in ethanol.

With reference to the drawings, and particularly FIGS. 1, 2 and 3, it will be seen that the ultraviolet spectra of the two actinomycins $F_1$ and $F_3$ (FIG. 1) as well as their respective infrared spectra (FIGS. 2 and 3), are typical actinomycin spectra exhibiting substantially the same absorption characteristics for both $F_1$ and $F_3$ within the infrared as well as the ultraviolet regions. As for most other actinomycins heretofore isolated and identified as distinct compounds, minor differences over relatively short band widths are encountered but these are not significant enough to actually distinguish one actinomycin from another in the manner customarily possible with spectral characteristics of other chemical compounds.

Thus, the UV-spectra of both actinomycins $F_1$ and $F_3$ (FIG. 1) are identical with respect to the general characteristics of the absorption curves, and differ but slightly—according to the difference in their molecular weights—in the height of the absorption maxima. The double band at 444 and 430 millimicrons obtained in ethanol is attributed to the phenoxazone ring of the actinomycin molecule. The specific extinction coefficients (extinction for $d=1$ cm. and $c=1$ g./liter) in ethanol at 444 millimicrons are as follows:

Actinomycin $F_1 = 19.0$
Actinomycin $F_3 = 18.5$

The two infrared spectra (FIG. 2) of the actinomycins $F_1$ and $F_3$ are also identical, and represent typical spectra of actinomycins having the bands 2.95 microns (N–H banding vibration); 3.4 microns (C–H banding vibration); 5.75 microns (ester carbonyl); 6.05 microns (acid amide carbonyl); and 6.35 microns (double bond banding vibration).

Figure 4:
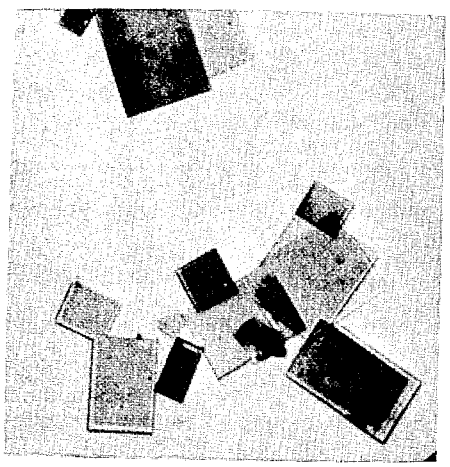
FIGS. 4 and 5 are photographs of actinomycin $F_1$ crystals and actinomycin C crystals, respectively.
Figure 5:
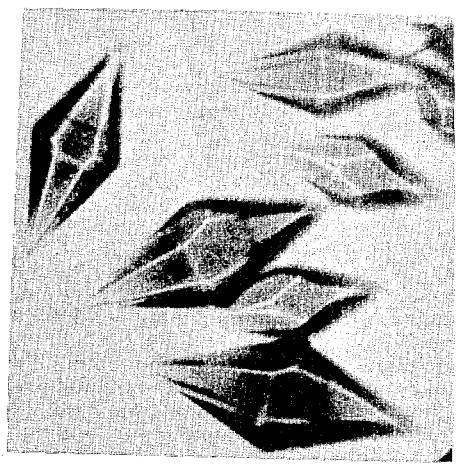

With reference to FIGS. 4 and 5, while the known actinomycins including $C_1$, $C_2$, $C_3$, I and X crystallize in rhombic bi-pyramids such as those illustrated for actinomycin C in FIG. 5, the new actinomycins $F_1$ and $F_3$ are characterized by crystals of rectangular platelet form such as those for actinomycin $F_1$ illustrated in FIG. 4. The crystal form of actinomycin $F_3$ in very similar to that of actinomycin $F_1$.

Upon combustion analysis, the new actinomycins yield the following data:

|  | $F_1$, percent | $F_3$, percent |
|---|---|---|
| Carbon | 56.80 | 57.85 |
| Hydrogen | 7.35 | 7.29 |
| Nitrogen | 13.05 | 9.55 |

Upon hydrolyzing the actinomycins $F_1$ and $F_3$ with hydrochloric acid during 24 hours at 100° C., followed by paper chromatographic determination of the amino acids content of each compound, the following results were obtained:

| $F_1$ | $F_3$ |
|---|---|
| Threonine | Threonine. |
| Sarcosine | Sarcosine. |
| Valine |  |
| Isoleucine | Isoleucine. |
| N-methylvaline | N-methylvaline. |

It is believed that the following specific example will further serve to illustrate the subject matter of the invention:

*Example*

Three (3) grams of an actinomycin C mixture obtained in accordance with the procedure outlined in Example 7 of the aforementioned German Patent No. 944,395, i.e., by the addition of sarcosine to the nutrient solution of the actinomycin C-elaborator BOP 476, were dissolved in 150 cubic centimeters of benzol. The resulting solution was filtered through a column of alumina saturated with benzol and measuring 45 centimeters high by 5 centimeters in diameter. Upon washing again with 3 liters of a mixture of 60 percent (volumetric) of benzol and 40% (volumetric) of ethyl ester, a fractionation of the actinomycin C mixture on the alumina column was effected in 3 distinct zones. By further washing with the benzol-acetic ester mixture, the lowermost and middle zones were eluted. The top zone was then washed away with pure acetic ester. The benzol and acetic ester were distilled from the individual eluates under a slight vacuum. The solid residues were taken up in a little acetone, and from these solutions the actinomycins were precipitated with ligroin or petroleum ether. The yields were as follows:

```
                                                    Percent
1st zone—0.36 gram _____ 12
2nd zone—1.08 grams _____ 36
3rd zone—1.23 grams _____ 41
                                                    ——
                                                    89
```

The composition of each individual zone was determined in the ring-chromatogram. After applying the different zones, the paper was sprayed with the aqueous phase consisting of a mixture of 5% (vol.) of di-n-butyl ether, 35% (vol.) of di-n-propyl ether, 10% (vol.) of butanol, and 50% (vol.) of an aqueous solution of sodium m-cresotinate, and developed with the organic phase of this mixture. The position of the various actinomycin zones in the chromatogram was indicated by its $R_{C_2}$ value. The $R_{C_2}$ value is calculated by dividing the path length of the respective component into the path length of the actinomycin $C_2$, which was selected as the reference actinomycin.

The first zone was found to contain three actinomycins with the $R_{C_2}$ values:

0.6 = actinomycin $C_1$
1.0 = actinomycin $C_2$
1.6 = actinomycin $C_3$

The second zone, apart from the component $F_0$ present in small amount, was found to contain two actinomycins with the $R_{C_2}$ values:

$0.8$ = actinomycin $F_2$
$1.3$ = actinomycin $F_4$

The third zone was found to contain four actinomycins with the $R_{C_2}$ values:

$0.6$ = actinomycin $F_1$
$0.8$ = actinomycin $F_2$
$1.0$ = actinomycin $F_3$
$1.3$ = actinomycin $F_4$ Two hundred and fifty (250) grams of a finely-ground cellulose powder were stirred with 1.1 liters of the aqueous phase of a mixture composed of 10% (vol.) of di-n-butyl ether, 27% (vol.) of di-n-propyl ether, 13% (vol.) of butanol, and 50% of an aqueous solution of sodium m-cresotinate, such as to form a slurry free from entrapped air bubbles. This slurry was charged into a chromatographic tube measuring 40 centimeters in height by 5 centimeters in diameter. By using a slight pressure, the organic phase was filtered through the column until the first portions thereof drop out of the column.

Through the above pretreated column were filtered 500 mg. of the third zone of the alumina column, dissolved within 100 cubic centimeters of the organic phase of the system detailed above. On continued passage of the organic phase, the actinomycin mixture of the third zone of the alumina column separated into four (4) zones which were fractionally eluted with the organic phase. The pure actinomycins were recovered from the various zones in crystalline form by conventional techniques.

The yields were as follows:

Actinomycin $F_1$—160 mg.
Actinomycin $F_2$—146 mg.
Actinomycin $F_3$—76 mg.
Actinomycin $F_4$—37 mg.

The total yield was 84% of theoretical.

According to the ring chromatogram, the $R_{C_2}$ values found for the four zones of the cellulose column in the elution sequence, were, the fastest traveling or first zone—1.3 (actinomycin $F_4$); the second zone—1.0 (actinomycin $F_3$); the third zone—0.8 (actinomycin $F_2$); and the fourth zone—0.6 (actinomycin $F_1$).

Having thus described the subject matter of our invention, what it is desired to secure by Letters Patent is:

1. Process for the production of actinomycin $F_1$, that comprises cultivating a Streptomyces actinomycin C-producing microorganism selected from the group consisting of strains NRRL 2580 and NRRL 2250 within a sarcosine-containing nutrient medium to produce a mixture of actinomycins, subjecting the mixture of actinomycins to adsorption chromatography on an alumina column to effect fractionation of the actinomycin mixture into three distinct zones including one zone containing actinomycins $F_1$ and $F_3$ in admixture with other actinomycin substances, subjecting said actinomycin $F_1$ and $F_3$-containing zone to partition chromatography on a cellulose-powder column to effect zonal separation of said actinomycin $F_1$ and $F_3$ components, and fractionally eluting said column for the separation and recovery of pure actinomycin $F_1$.

2. The process as claimed in claim 1 wherein the actinomycin C-producing microorganism employed in Streptomycin NRRL 2580 and the partition chromatography of said actinomycin $F_1$ and $F_3$-containing zone is effected in a cellulose-powder column employing an aqueous phase of a mixture composed of 10 percent di-n-butyl ether, 27 percent di-n-propyl ether and 13 percent of butanol.

References Cited by the Examiner
UNITED STATES PATENTS 2,953,495   9/1960   Brockmann et al. _____ 167—65

FOREIGN PATENTS 944,395   6/1956   Germany.

OTHER REFERENCES

Ainsworth et al.: J. Gen. Microbiol., 10, 465–474, June 1954.

Angewandte Chemie, vol. 68, No. 2, 1956, pp. 66—71.

Hesseltine et al.: N.Y. Academy of Science, vol. 60, Art, pages 136–151, Oct. 29, 1954.

Waksman: Antibiotics and Chemotherapy, May 1954, pp. 502–509.

Pridham et al.: Applied Microbiology, January 1958, pp. 52–79.

Ann. of the New York Academy of Sciences, vol. 89, Art 2, pp. 287–297.

JULIAN S. LEVITT, *Primary Examiner.*

WILLIAM B. KNIGHT, MORRIS O. WOLK, IRVING MARCUS, *Examiners.*